(12) United States Patent
Ejiri

(10) Patent No.: US 7,823,859 B2
(45) Date of Patent: Nov. 2, 2010

(54) NORMALLY-CLOSED VALVE HAVING A MICROFLOW RATE ADJUSTING DEVICE

(75) Inventor: Takashi Ejiri, Tokyo (JP)

(73) Assignee: Fujikura Rubber Ltd., Tokyo (JP)

( * ) Notice: Subject to any disclaimer, the term of this patent is extended or adjusted under 35 U.S.C. 154(b) by 653 days.

(21) Appl. No.: 11/817,513

(22) PCT Filed: Feb. 24, 2006

(86) PCT No.: PCT/JP2006/303380

§ 371 (c)(1),
(2), (4) Date: Aug. 31, 2007

(87) PCT Pub. No.: WO2006/093036

PCT Pub. Date: Sep. 8, 2006

(65) Prior Publication Data

US 2009/0050832 A1    Feb. 26, 2009

(30) Foreign Application Priority Data

Mar. 1, 2005    (JP)    ............................. 2005-056323

(51) Int. Cl.
 *F16K 31/12*    (2006.01)
(52) U.S. Cl. .......................... 251/60; 251/62; 251/63.6; 251/285
(58) Field of Classification Search .................. 251/62, 251/63, 63.4, 63.5, 63.6, 284, 285, 60
See application file for complete search history.

(56) References Cited

U.S. PATENT DOCUMENTS

| 4,169,405 | A | * | 10/1979 | Tsunemoto et al. | .......... 92/13.6 |
| 5,007,328 | A | | 4/1991 | Otteman | |
| 5,390,895 | A | | 2/1995 | Iwabuchi | |
| 6,244,562 | B1 | | 6/2001 | Ejiri | |
| 6,244,563 | B1 | * | 6/2001 | Ejiri | .......................... 251/63.6 |
| 6,585,226 | B2 | * | 7/2003 | Fukano et al. | .................. 251/28 |

(Continued)

FOREIGN PATENT DOCUMENTS

JP    6-59669    8/1994

(Continued)

OTHER PUBLICATIONS

International Search Report for PCT/JP2006/303380.

*Primary Examiner*—John K Fristoe, Jr.
(74) *Attorney, Agent, or Firm*—McCormick, Paulding & Huber LLP

(57) ABSTRACT

A normally-closed valve having a microflow rate adjusting device includes a valve stem for opening and closing a fluid passage; a biasing device for biasing the valve stem in a direction to close the fluid passage; a piston body which is engaged in a cylinder in an air-tight manner to form a pressure chamber for moving the valve stem in a valve opening direction against the biasing device; and a stopper mechanism, provided on the cylinder, for controlling a limit of movement of the piston body in the valve opening direction. The stopper mechanism comprises a stroke adjustment member which is screw-engaged with the cylinder coaxially with the valve stem so that a position of the stroke adjustment member relative to the cylinder can be adjusted, and includes an annular tapered surface at an end of the stroke adjustment member which faces the piston body.

6 Claims, 4 Drawing Sheets

U.S. PATENT DOCUMENTS 6,814,338 B2 *  11/2004  Kajitani .................... 251/63.6
6,997,209 B2 *   2/2006  Ejiri ......................... 137/556

FOREIGN PATENT DOCUMENTS

| | | |
|---|---|---|
| JP | 6294472 | 10/1994 |
| JP | 8170755 | 7/1996 |
| JP | 10299915 | 11/1998 |
| JP | 2001-27354 | 1/2001 |

* cited by examiner

NORMALLY-CLOSED VALVE HAVING A MICROFLOW RATE ADJUSTING DEVICE

CROSS REFERENCE TO RELATED APPLICATION

This application claims the benefit of PCT Application No. PCT/JP2006/303380, filed Feb. 24, 2006 and Japanese Patent Application No. 2005-56323, filed Mar. 1, 2005, the disclosures of which are herein incorporated by reference in their entirety.

FIELD OF THE INVENTION

The present invention relates to a normally-closed valve capable of adjusting the rate of microflow.

BACKGROUND OF THE INVENTION

A normally-closed valve is generally provided with a valve stem which opens and closes a fluid channel, a compression spring which biases the valve stem in a direction to close the fluid channel, and a piston body which is fitted in a cylinder in an air-tight fashion to be movable therein to thereby form a pressure chamber for moving the valve stem in a valve opening direction against the compression spring. The maximum valve-opening of this type of normally-closed valve can be adjusted by controlling the limit of movement of the piston body in the valve opening direction thereof. However, in this conventional type of normally-closed valve, since the flow rate is adjusted simply by adjusting the axial position of a stopper which is screw-engaged with the cylinder, the valve opening is determined by the pitch of the screw and the angle of rotation of the stopper, and accordingly, it is difficult to make a fine adjustment to the flow rate.

OBJECT OF THE INVENTION

An object of the present invention is to obtain a normally-closed valve having a microflow rate adjusting device capable of adjusting the flow rate more finely than before.

SUMMARY OF THE INVENTION

The present invention is characterized by a normally-closed valve having a microflow rate adjusting device, including a valve stem for opening and closing a fluid passage; a biasing device for biasing the valve stem in a direction to close the fluid passage; a piston body which is engaged in a cylinder in an air-tight manner to form a pressure chamber for moving the valve stem in a valve opening direction against the biasing device; and a stopper mechanism, provided on the cylinder, for controlling a limit of movement of the piston body in the valve opening direction. The stopper mechanism comprises a stroke adjustment member which is screw-engaged with the cylinder coaxially with the valve stem so that a position of the stroke adjustment member relative to the cylinder can be adjusted, and includes an annular tapered surface at an end of the stroke adjustment member which faces the piston body; a movable valve opening control surface provided on the piston body to be positioned radially outside of the annular tapered surface; a stationary valve opening control surface provided integrally with the cylinder to face the movable valve opening control surface, at least one of the movable valve opening control surface and the stationary valve opening control surface comprising a tapered surface which is tapered to reduce a distance between the movable valve opening control surface and the stationary valve opening control surface in a direction toward an outer edge of the tapered surface; and a plurality of balls capable of coming in simultaneous contact with each of the annular tapered surface, the movable valve opening control surface and the stationary valve opening control surface.

An end cap can be fixed to an end of the cylinder to close the end of the cylinder. In this embodiment, it is possible that the stroke adjustment member be screw-engaged with the end cap and that the stationary valve opening control surface be formed on the end cap.

Alternatively, the stroke adjustment member can be composed of an end cap which is screw-engaged with an end of the cylinder to close the end of the cylinder. In this embodiment, it is possible that a fixing member including the stationary valve opening control surface be fixed to the cylinder to be positioned inside the stroke adjustment member and radially outside of the annular tapered surface.

Although both the movable valve opening control surface and the stationary valve opening control surface can be formed in tapered surfaces, it is practical that one and the other of the movable valve opening control surface and the stationary valve opening control surface be formed as a part of a circular conical surface and a plane orthogonal to an axis of the valve stem, respectively.

The normally-closed valve can be provided inside the cylinder with guide grooves for limiting directions of movements of the plurality of balls to radial directions of the cylinder. It is desirable that the number of the guide grooves (balls) be three and that the three guide grooves (balls) be arranged circumferentially at equi-angular intervals.

According to the normally-closed valve to which the present invention is applied, the ratio of the amount of axial movement of the stroke adjustment member to the amount of axial movement of the piston body can be freely set by changing the angles of the annular tapered surface, the movable valve opening control surface and the stationary valve opening control surface. For instance, a minute valve opening can be achieved by setting this ratio to a ratio of 1 to 1/2 through 1 to 1/50.

DESCRIPTION OF THE PREFERRED EMBODIMENTS

Figure 1:
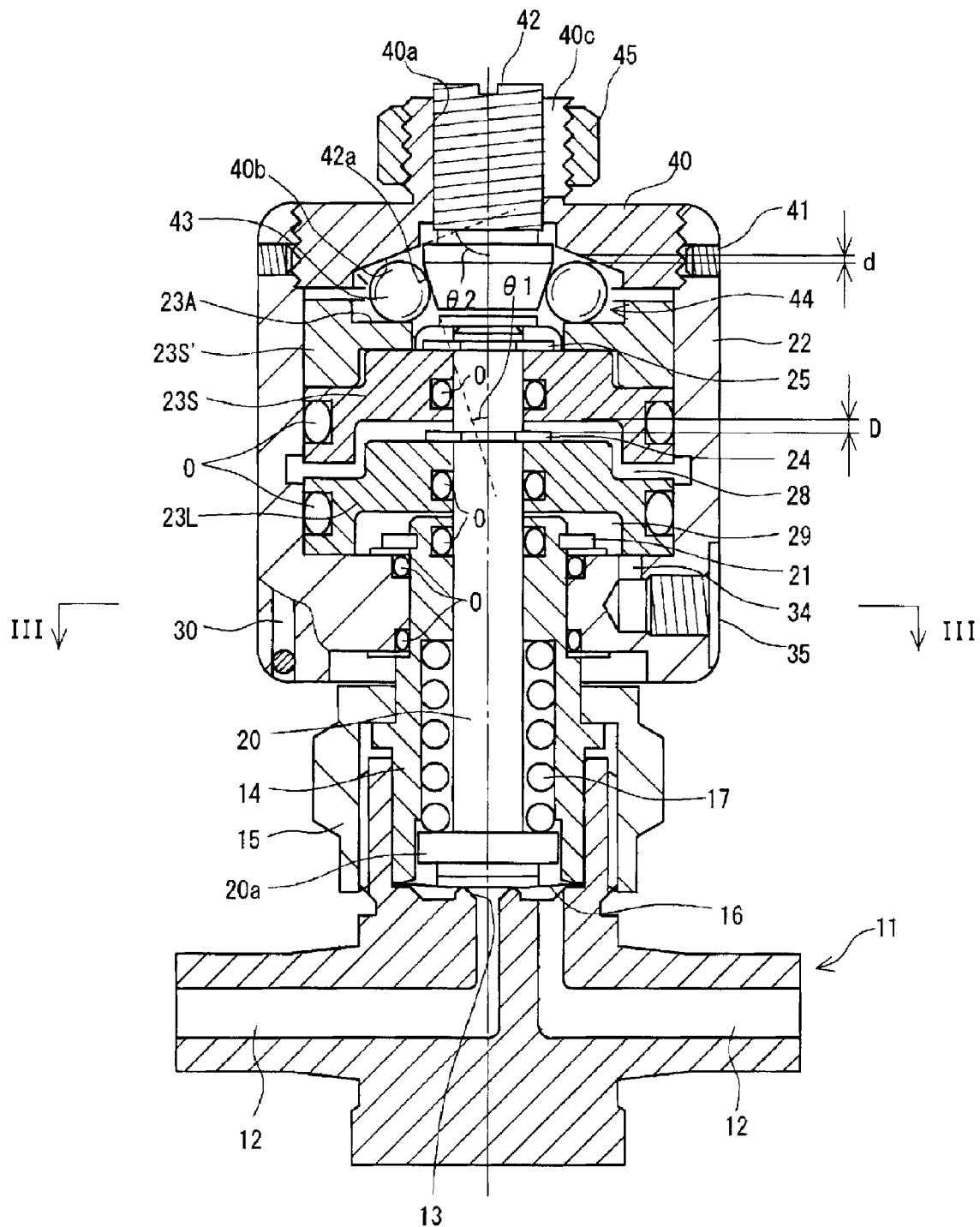
FIG. 1 is a cross sectional view taken along I-I line shown in FIG. 3, showing an embodiment of a two-stage-actuation normally-closed valve.
Figure 2:
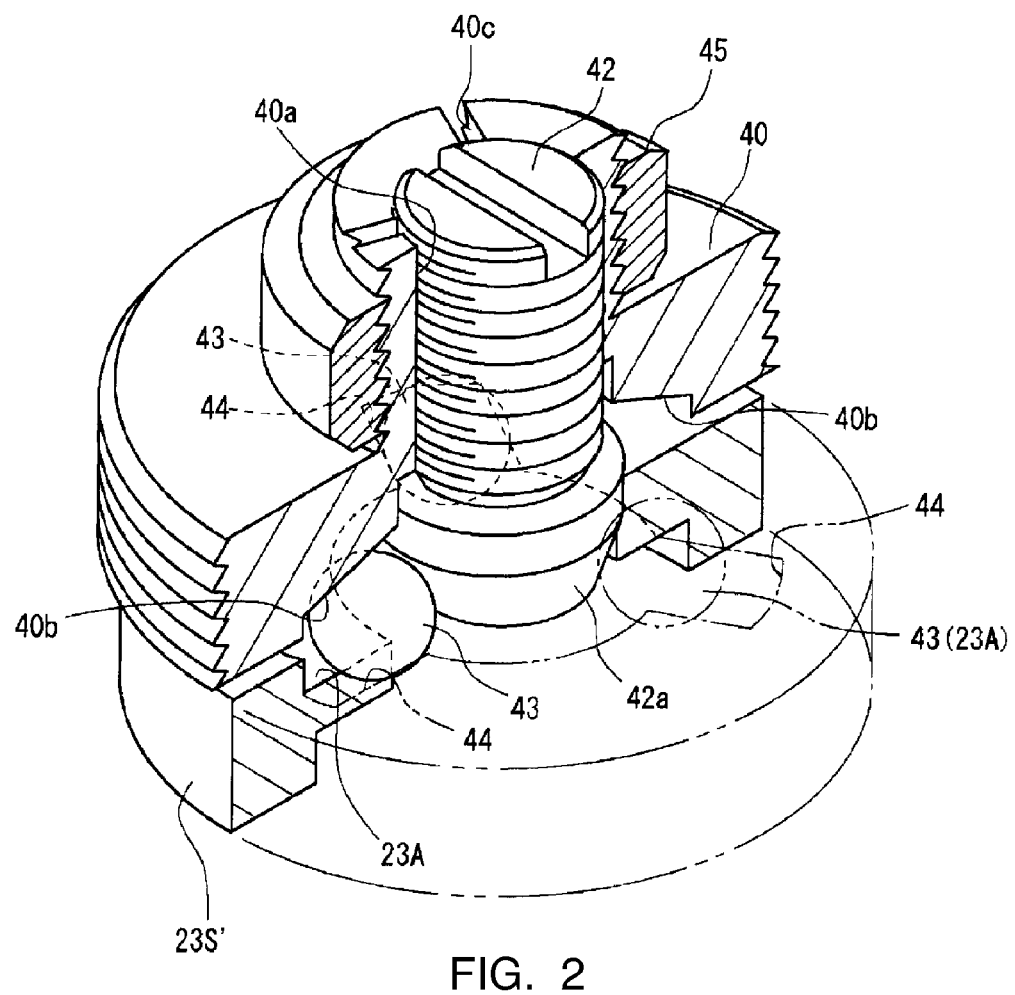
FIG. 2 is a perspective view, partly in cross section, of a portion of the normally-closed valve shown in FIG. 1, showing the relationship between a pair of valve opening control surfaces and balls.
Figure 3:
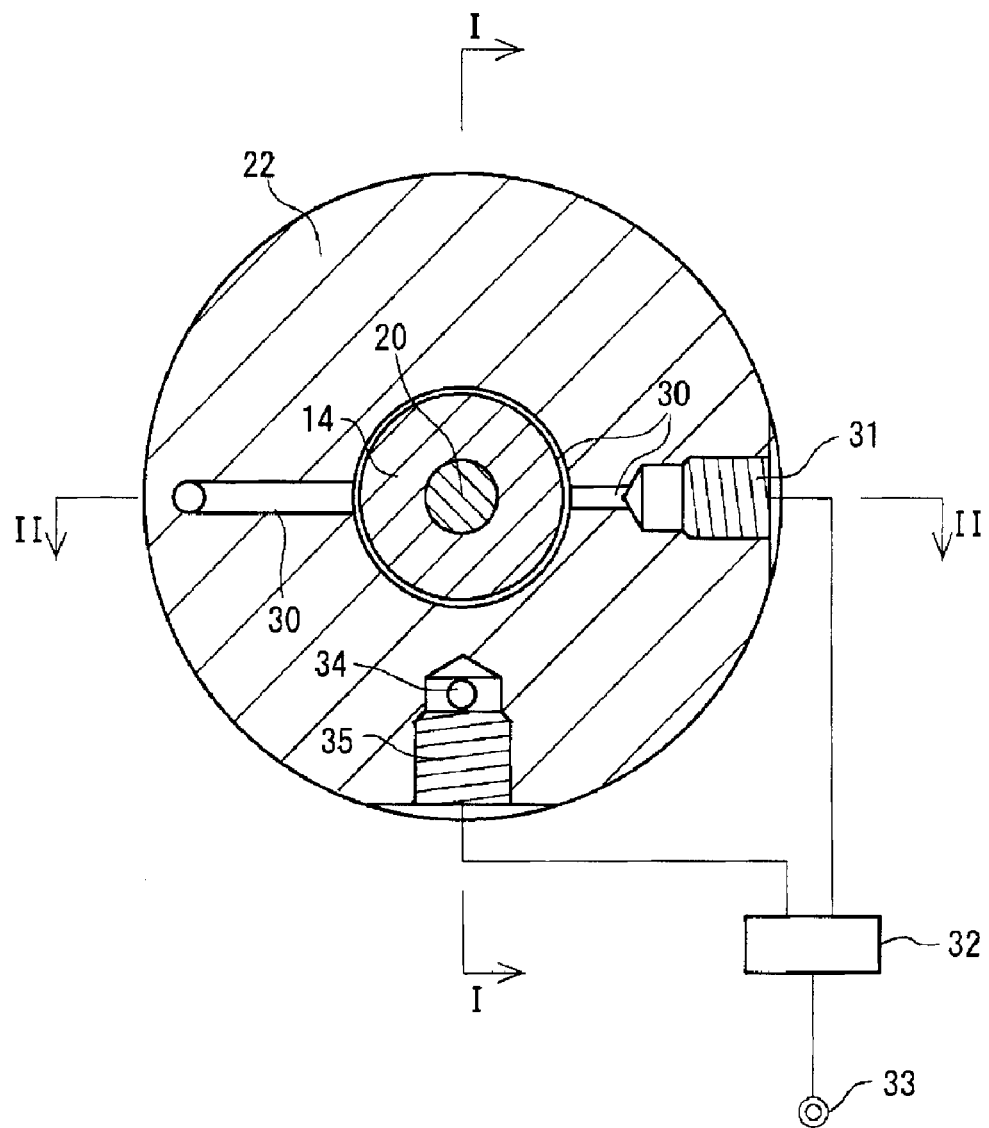
FIG. 3 is a cross sectional view taken along III-III line shown in FIG. 1.

FIGS. 1 through 3 show an embodiment of a two-stage-actuation normally-closed valve which can switch the rate of fluid flow between a low flow rate (e.g., several c.c. per minute) and a high flow rate (e.g., a few liters per minute). A fluid channel block 11 that is positioned at the bottom of the normally-closed valve as viewed in FIG. 1 is provided with a fluid passage 12, and a valve seat 13 having an axis that extends vertically as viewed in FIG. 1 is formed on the fluid channel block 11 at a part of the fluid passage 12. A rod holder 14, which guides a valve stem 20 arranged coaxially with the valve seat 13, is fixed to the fluid channel block 11 via a connector sleeve 15, and the outer edge of a metal diaphragm 16 which opens and closes the valve seat 13 is attached between the lower end of the rod holder 14 and the fluid channel block 11. A compression spring 17 which biases the valve stem 20 downwards as viewed in FIG. 1 to press the metal diaphragm 16 against the valve seat 13 via the valve stem 20 is inserted in between the rod holder 14 and a flange 20a of the valve stem 20. Therefore, the valve stem 20 is continuously biased in a direction to close the valve seat 13 via the metal diaphragm 16.

A cylinder 22 is fixed to the upper end of the rod holder 14 as viewed in FIG. 1 via a retaining ring 21. The cylinder 22 is closed at the lower end thereof by the rod holder 14, and the valve stem 20 extends from the rod holder 14 into the cylinder 22.

A high-flow-rate piston body 23L and a low-flow-rate piston body 23S are fitted on the valve stem 20 in that order from the bottom thereof to be freely slidable thereon relative to each other. A floating piston body 23S' is fitted on the upper end of the low-flow-rate piston body 23S, as viewed in FIG. 1, to be slidably movable integrally with the low-flow-rate piston body 23S. The floating piston body 23S' can be formed integral with the low-flow-rate piston body 23S. In the following description, the floating piston body 23S' and the low-flow-rate piston body 23S, which slide as an integral body on the valve stem 20, are collectively regarded as the low-flow-rate piston body 23S unless otherwise noted.

Two stopper rings 24 and 25 which determine the limits of upward sliding movements of the high-flow-rate piston body 23L and the low-flow-rate piston body 23S on the valve stem 20, respectively, as viewed in FIG. 1, are attached to the valve stem 20. When each of the high-flow-rate piston body 23L and the low-flow-rate piston body 23S moves in a valve opening direction (upward direction as viewed in FIG. 1) that is opposite to the direction of movement of the valve stem 20 caused by the compression spring 17, the stopper rings 24 and 25 operate to move the valve stem 20 with the high-flow-rate piston body 23L and the low-flow-rate piston body 23S in the valve opening direction, respectively. On the other hand, the stopper rings 24 and 25 do not prevent the high-flow-rate piston body 23L and the low-flow-rate piston body 23S from moving downward, as viewed in FIG. 1, relative to the valve stem 20, respectively.

An end cap 40 for closing the upper end (as viewed in FIG. 1) of the cylinder 22 is screwed into the upper end of the cylinder 22, and fixed to the cylinder 22 by a set screw 41. A female screw thread 40a (see FIG. 2 also) is formed inside a shaft portion of the end cap 40, and a stroke adjustment screw (stroke adjustment member) 42 formed coaxially with the valve stem 20 is screw-engaged with the female screw thread 40a. An annular tapered surface 42a is formed on an outer peripheral surface of the end (lower end) of the stroke adjustment screw 42 which faces the upper surface of the low-flow-rate piston body 23S. The axial position of the annular tapered surface 42a changes by adjusting the position of screw-engagement of the stroke adjustment screw 42 relative to the female screw thread 40a. A tapered male screw thread is formed on the end cap 40 to be coaxial with the female screw thread 40a, and slits 40c are formed in this tapered male screw thread to cut therethrough. A lock nut 45 having a corresponding female screw thread is screw-engaged with the tapered male screw thread of the end cap 40. The stroke adjustment screw 42 can be rotated if the lock nut 45 is loosened, and is locked if the lock nut 45 is tightened.

Surfaces of the end cap 40 and the low-flow-rate piston body 23S which face each other constitute valve opening control surfaces 40b and 23A, respectively, which are positioned around the annular tapered surface 42a. In this embodiment, the valve opening control surface 23A is positioned at the upper end of the low-flow-rate piston body 23S (the floating piston body 23S'), and lies in a plane orthogonal to the axis of the low-flow-rate piston body 23S (the cylinder 22). The valve opening control surface 40b is formed as a part of a circular conical surface which reduces the distance from the valve opening control surface 23A in radially outward directions. The valve opening control surface 40b is referred to as a truncated-cone-shaped concave surface.

A plurality of balls (hard balls) 43 are inserted into the space which is surrounded by the annular tapered surface 42a, the valve opening control surface 40b of the end cap 40 and the valve opening control surface 23A of the low-flow-rate piston body 23S. The plurality of balls 43 are pushed out toward the outer edges of the valve opening control surface 40b and the valve opening control surface 23A as the stroke adjustment screw 42 is screwed deeply. On the other hand, since the valve opening control surface 40b and the valve opening control surface 23A decreases the space therebetween in radially outward directions, the relatively movable distance between the valve opening control surface 40b and the valve opening control surface 23A decreases as the balls 43 move toward the outer edges of the valve opening control surface 40b and the valve opening control surface 23A. Namely, the movable distance of the low-flow-rate piston body 23S relative to the end cap 40 decreases as the balls 43 are pushed out toward the outer edges of the valve opening control surface 40b and the valve opening control surface 23A, and the movable distance of the low-flow-rate piston body 23S becomes great if the balls 43 are movable inwards. In the drawing, this movable distance is shown exaggeratedly as a distance d between the balls 43 and the valve opening control surface 40b. In short, this distance d decreases as the balls 43 are pushed out toward the outer edges of the valve opening control surface 40b and the valve opening control surface 23A by the annular tapered surface 42a.

Three ball-guide grooves 44 which are arranged at intervals of 120 degrees to extend radially outwards are formed on the low-flow-rate piston body 23S, specifically on the floating piston body 23S', and the bottoms of the three ball-guide grooves 44 form the valve opening control surface 23A. Although it is possible that the plurality of balls 43 be arranged circumferentially with no intervals therebetween, it is desirable that the number of the balls 43 be three in practice. Note that the three balls 43 are actually arranged at intervals of 120 degrees though two of the three balls 42 are shown in the same cross section in FIG. 1 for the purpose of illustration.

In the present embodiment, the valve opening control surfaces 40b, the annular tapered surface 42a (the stroke adjustment screw 42), the plurality of balls 43 and the valve opening control surface 23A constitute a stopper mechanism for controlling a limit of movement of the low-flow-rate piston body 23S.

On the other hand, the limit of upward movement of the high-flow-rate piston body 23L is determined at a point where the high-flow-rate piston body 23L (more specifically, the stopper ring 24) comes into contact with the low-flow-rate piston body 23S. The distance D between the high-flow-rate piston body 23L and the low-flow-rate piston body 23S is far greater than the distance d (D)d).

A low-flow-rate pilot pressure chamber 28 is formed among the cylinder 22, the high-flow-rate piston body 23L, the low-flow-rate piston body 23S and the valve stem 20, and a high-flow-rate pilot pressure chamber 29 is formed between the high-flow-rate piston body 23L and the valve stem 20. The low-flow-rate pilot pressure chamber 28 is communicatively connected to a low-flow-rate pilot pressure passage 30 and a connection port 31 (see FIGS. 3 and 4) which are formed in the cylinder 22, and the low-flow-rate-pilot-pressure connection port 31 is connected to a pilot pressure source 33 via a control valve 32. Similarly, the high-flow-rate pilot pressure chamber 29 is communicatively connected to a high-flow-rate pilot pressure passage 34 and a connection port 35, and the high-flow-rate pilot pressure connection port 35 is connected to the pilot pressure source 33 via the control valve 32 (see FIGS. 1 and 3). Note that the letter "O" designates air-tight O-rings in FIGS. 1 and 2.

The present apparatus having the above described structure operates as follows. In a state where no pilot pressure is brought into either the low-flow-rate-pilot-pressure connection port 31 or the high-flow-rate-pilot-pressure connection port 35, the valve stem 20 which is biased in a valve closing direction by the force of the compression spring 17 presses the metal diaphragm 16 against the valve seat 13 to close the fluid passage 12. In this valve-closed state, if it is desired to make a fluid flow at a low flow rate, a pilot pressure is applied to the low-flow-rate-pilot-pressure connection port 31 via the control valve 32. Thereupon, the pilot pressure is brought into the low-flow-rate pilot pressure chamber 28 via the low-flow-rate pilot pressure passage 30, an upward force as viewed in FIG. 1 is applied to the low-flow-rate piston body 23S, and a downward force as viewed in FIG. 1 is applied to the high-flow-rate piston body 23L. Therefore, the low-flow-rate piston body 23S moves upward with the valve stem 20 via the stopper ring 25, and the limit of this upward movement is determined at a point where the low-flow-rate piston body 23S comes into contact with the plurality of balls 43.

The limit of movement of the low-flow-rate piston body 23S in the valve opening direction can be adjusted by operating the stroke adjustment screw 42. If the lock nut 45 is loosened to make the position of the screw-engagement of the lock nut 45 with the end cap 40 of the stroke adjustment screw 42 shallow, the plurality of balls 43 are brought to the center of the cylinder 22 via the valve opening control surface 40b so that the movable distance d of the low-flow-rate piston body 23S increases since the annular tapered surface 42a that comes in contact with the plurality of balls 43 tapers to decrease in diameter. Conversely, if the lock nut 45 is screwed in to make the position of the screw-engagement of the lock nut 45 with the end cap 40 of the stroke adjustment screw 42 deep, the plurality of balls 43 are pushed out toward the limb of the cylinder 22 so that the movable distance d of the low-flow-rate piston body 23S decreases. Although shown exaggeratedly in the drawing for purpose of illustration, the movable distance d is (cam be made) extremely small, and accordingly, the gap formed between the metal diaphragm 16 and the valve seat 13 can be adjusted to a degree necessary for obtaining a flow rate of approximately a few c.c. per minute, or less; moreover, this gap can be finely adjusted. Although the high-flow-rate piston body 23L moves downward relative to the valve stem 20 to come in contact with the rod holder 14, this relative movement exerts no influence on the above described low-flow-rate valve opening. An index serving as a guide for a screw-engagement position can be provided to an end surface or a peripheral surface of the stroke adjustment screw 42.

If it is desired to make a fluid flow at a high flow rate, the pilot pressure to the low-flow-rate-pilot-pressure connection port 31 is discharged while a pilot pressure is supplied to the high-flow-rate pilot pressure connection port 35. Thereupon, the pilot pressure is brought into the high-flow-rate pilot pressure chamber 29 via the high-flow-rate pilot pressure passage 34, and an upward force as viewed in FIG. 1 is applied to the high-flow-rate piston body 23L. Therefore, the high-flow-rate piston body 23L moves upward with the valve stem 20 via the stopper ring 24, and the limit of this upward movement is determined at a point where the high-flow-rate piston body 23L comes into contact with the low-flow-rate piston body 23S or a point where the flange 20a of the valve stem 20 and the stepped portion of the rod holder 14 come into contact with each other. Even if the low-flow-rate piston body 23S is moved to the limit of movement thereof, the high-flow-rate piston body 23L and the valve stem 20 can move upward. Since the distance D between the high-flow-rate piston body 23L and the low-flow-rate piston body 23S is (can be made) far greater than the distance d, the gap formed between the metal diaphragm 16 and the valve seat 13 becomes a gap (can be adjusted to a degree) necessary for obtaining a flow rate of approximately several liters per minute.

When a flow is produced at a high flow rate, a pilot pressure greater than the pilot pressure supplied to the low-flow-rate-pilot-pressure connection port 31 can of course be brought into the high-flow-rate pilot pressure connection port 35 instead of stopping the supply of the pilot pressure to the low-flow-rate-pilot-pressure connection port 31.

In the above illustrated embodiment, the ratio of the amount of axial movement of the stroke adjustment screw 42 to the amount of axial movement of the low-flow-rate piston body 23S can be freely set by changing the angles of the annular tapered surface 42a of the stroke adjustment screw 42, the valve opening control surface 40b of the end cap 40, and the valve opening control surface 23A of the low-flow-rate piston body 23S. More specifically, for instance, in the case where the angle $\theta 1$ (shown in FIG. 1) of the annular tapered surface 42a of the stroke adjustment screw 42 is set to 15 degrees, where the angle $\theta 2$ (shown in FIG. 1) of the valve opening control surface 40b of the end cap 40 is set to 69 degrees, and where the valve opening control surface 23A of the low-flow-rate piston body 23S is set to a flat surface (0 degree) orthogonal to the axis of the low-flow-rate piston body 23S, the amount of movement of the valve stem 20 becomes one tenth (1/10) of the unit moving amount (1) of the stroke adjustment screw 42. If the amount of movement of the valve stem 20 relative to the amount of movement of the stroke adjustment screw 42 is small in this manner, the flow rate when the valve is opened can be easily finely adjusted.

Figure 4:
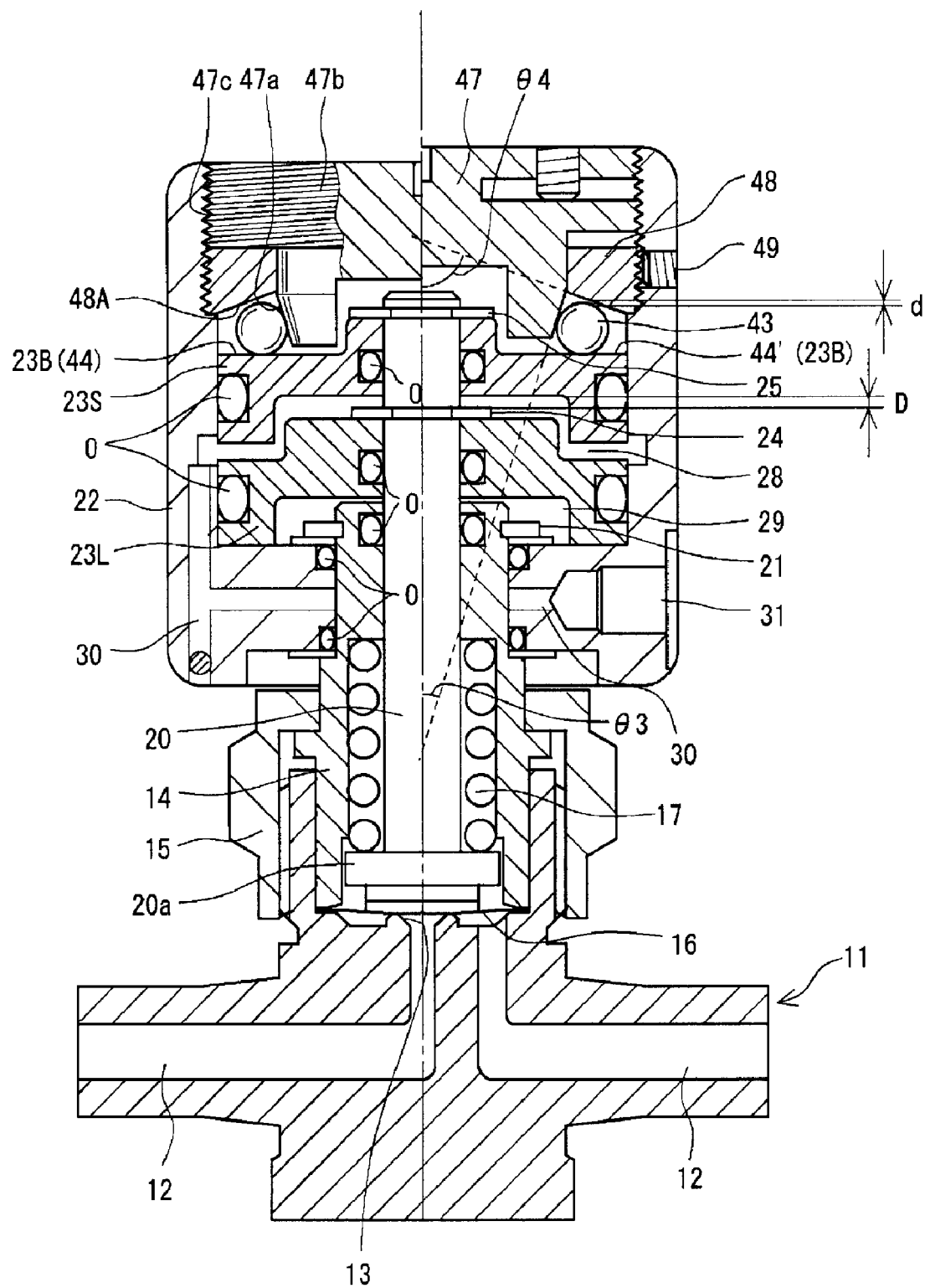
FIG. 4 is a cross sectional view taken along II-II line shown in FIG. 3, showing a second embodiment of the two-stage-actuation normally-closed valve.

FIG. 4 shows another embodiment of the normally-closed valve having a microflow rate adjusting device. In FIG. 4, elements substantially the same as those of the embodiment shown in FIGS. 1 through 3 are designated by the same reference numerals. In this embodiment, an end cap for closing the upper end of the cylinder 22 as viewed in FIG. 4 is made from a stroke adjustment cap 47 which is screw-engaged with the cylinder 22. An annular tapered surface 47a is formed on an end of the stroke adjustment cap 47. The stroke adjustment cap 47 is provided with a thin-walled portion 47b which extends radially, and a lock screw 47c is screwed into the thin-walled portion 47b in a direction parallel to the axis of the stroke adjustment cap 47. Screwing the lock screw 47c into the thin-walled portion 47b causes the thin-walled portion 47b to be resiliently deformed, thus preventing the stroke adjustment cap 47 from rotating, and the stroke adjustment cap 47 is allowed to be rotated if the lock screw 47c is loosened.

A fixing ring 48 is screwed into the cylinder 22 to be positioned inside the stroke adjustment cap 47 and radially outside of the annular tapered surface 47a, and is fixed to the cylinder 22 via a set screw 49. An end surface of the fixing ring 48 on the low-flow-rate piston body 23S side is formed as a truncated-cone-shaped concave surface (valve opening control surface) 48A, and the low-flow-rate piston body 23S is provided, on a surface thereof facing the truncated-cone-shaped concave surface 48A, with a valve opening control surface 23B which lies in a plane orthogonal to the axis of the cylinder 22. The truncated-cone-shaped concave surface 48A and the valve opening control surface 23B constitute a pair of valve opening control surfaces which are positioned around the annular tapered surface 47a and which reduce the distance between the pair of valve opening control surfaces in radially outward directions. A plurality of balls (three balls arranged circumferentially at intervals of 120 degrees) 43 are inserted into the space which is surrounded by the truncated-cone-shaped concave surface 48A, the valve opening control surface 23B and the annular tapered surface 47a. Guide grooves 44' for guiding the balls 43 are formed on the low-flow-rate piston body 23S to extend radially, and the bottoms of the guide grooves 44' form the aforementioned valve opening control surface 23B.

In this illustrated embodiment also, the limit of movement of the low-flow-rate piston body 23S (the valve stem 20) in the valve opening direction can be finely adjusted in a manner similar to that in the first embodiment. The available amount of movement of the low-flow-rate piston body 23S (the valve stem 20) relative to a unit moving amount of the stroke adjustment cap 47 in the axial direction thereof can be set by changing the angles of the annular tapered surface 47a of the stroke adjustment cap 47 and the truncated-cone-shaped concave surface 48A. Similar to the previous embodiment, to set the available amount of movement of the low-flow-rate piston body 23S to one tenth (1/10) of the unit moving amount of the stroke adjustment cap 47, the angle θ3 of the annular tapered surface 47a and the angle θ4 of the truncated-cone-shaped concave surface 48A can be set to, e.g., 15 degrees and 69 degrees, respectively.

Although each of the valve opening control surfaces 40b and 48A is formed in a truncated-cone-shaped concave surface and each of the valve opening control surfaces 23A and 23B that respectively face the valve opening control surfaces 40b and 48A is formed in an axially-orthogonal plane in the above illustrated embodiments, each of the valve opening control surfaces 40b and 48A, and 23A and 23B can be formed in a tapered surface. In addition, only a part of each of the valve opening control surfaces 40b and 48A, and 23A and 23B can be formed in a tapered surface; however, each of the valve opening control surfaces 40b and 48A can be easily made and brought into contact uniformly with the balls 43 if formed in a rotation-symmetrical surface.

Although the present invention is applied to a two-stage-actuation normally-closed valve which includes the high-flow-rate piston body 23L and the low-flow-rate piston body 23S in the above illustrated embodiments, the normally-closed valve can be made as a normally-closed valve from which the high-flow-rate piston body 23L is omitted if the normally-closed valve deals only with a fluid flow at a low flow rate. If the normally-closed valve is designed specifically for low flow rate, the low-flow-rate piston body 23S can be fixed to the valve stem 20.

Although each of the above illustrated embodiments is a type of normally-closed valve in which the valve stem 20 presses the metal diaphragm 16 for opening and closing the valve seat 13, the present invention can also be applied to a valve structure having a valve body which is installed directly to a metal bellows valve or the lower end of the valve stem 20, or to a valve structure which transmits movements of the valve stem 20 to a valve body provided independent of the valve stem.

Although each of the above illustrated embodiments is a type in which all of the piston bodies 23L, 23S and 23S' are fitted in the cylinder 22 to be freely slidable thereon, another type of piston body using a rolling diaphragm, the rim of which is fixed to a cylinder and a central portion of which is fixed to the piston body, can also be used.

INDUSTRIAL APPLICABILITY

According to the present invention, a normally-closed valve having a microflow rate adjusting device capable of adjusting the flow rate finely can be obtained and applied to various flow rate adjusting devices since the position of movement of the valve stem in the valve opening direction can be finely adjusted.

The invention claimed is:

1. A normally-closed valve having a microflow rate adjusting device, including:
   a valve stem for opening and closing a fluid passage;
   a biasing device for biasing said valve stem in a direction to close said fluid passage;
   a piston body which is engaged in a cylinder in an air-tight manner to form a pressure chamber for moving said valve stem in a valve opening direction against said biasing device; and
   a stopper mechanism, provided on said cylinder, for controlling a limit of movement of said piston body in said valve opening direction,
   wherein said stopper mechanism comprises:
   a stroke adjustment member which is screw-engaged with said cylinder coaxially with said valve stem so that a position of said stroke adjustment member relative to said cylinder can be adjusted, and includes an annular tapered surface at an end of said stroke adjustment member which faces said piston body;
   a movable valve opening control surface provided on said piston body to be positioned radially outside of said annular tapered surface;
   a stationary valve opening control surface provided integrally with said cylinder to face said movable valve opening control surface, at least one of said movable valve opening control surface and said stationary valve opening control surface comprising a tapered surface which is tapered to reduce a distance between said movable valve opening control surface and said stationary valve opening control surface in a direction toward an outer edge of said tapered surface; and
   a plurality of balls capable of coming in simultaneous contact with each of said annular tapered surface, said movable valve opening control surface and said stationary valve opening control surface.

2. The normally-closed valve having a microflow rate adjusting device according to claim 1, further comprising an end cap which is fixed to an end of said cylinder to close said end of said cylinder,
   wherein said stroke adjustment member is screw-engaged with said end cap, and
   wherein said stationary valve opening control surface is formed on said end cap.

3. The normally-closed valve having a microflow rate adjusting device according to claim 1, wherein said stroke adjustment member comprises an end cap which is screw-engaged with an end of said cylinder to close said end of said cylinder, and wherein a fixing member including said stationary valve opening control surface is fixed to said cylinder to be positioned inside said stroke adjustment member and radially outside of said annular tapered surface.

4. The normally-closed valve having a microflow rate adjusting device according to claim 1, wherein one and the other of said movable valve opening control surface and said stationary valve opening control surface are formed as a part of a circular conical surface and a plane orthogonal to an axis of said valve stem, respectively.

5. The normally-closed valve having a microflow rate adjusting device according to claim 1, further comprising guide grooves, provided inside said cylinder, for limiting directions of movements of said plurality of balls to radial directions of said cylinder.

6. The normally-closed valve having a microflow rate adjusting device according to claim 1, wherein angles of said annular tapered surface and said tapered surface of said at least one of said movable valve opening control surface and said stationary valve opening control surface are determined so that a ratio of an amount of axial movement of said stroke adjustment member to an amount of axial movement of said piston body becomes a ratio of 1 to 1/2 through 1 to 1/50.

* * * * *